United States Patent [19]
Peet

[11] 3,961,799
[45] June 8, 1976

[54] CONVERSION KIT

[75] Inventor: Harvey K. Peet, Providence, R.I.

[73] Assignee: Sealol, Inc., Warwick, R.I.

[22] Filed: Sept. 29, 1975

[21] Appl. No.: 617,458

[52] U.S. Cl. .................................. 277/9; 277/81 R
[51] Int. Cl.² ........................................ F16J 15/34
[58] Field of Search ................ 277/1, 9, 9.5, 32, 81, 277/88, 89

[56]           References Cited
              UNITED STATES PATENTS

| | | | |
|---|---|---|---|
| 2,584,679 | 2/1952 | Dobrosavleuic | 277/81 |
| 2,628,852 | 2/1953 | Voytech | 277/81 |
| 3,388,913 | 6/1968 | Tracy | 277/32 |
| 3,441,284 | 4/1969 | Murray et al. | 277/32 |

*Primary Examiner*—Robert I. Smith
*Attorney, Agent, or Firm*—Ralph L. Cadwallader; Leo M. Kelly

[57]           ABSTRACT

A conversion kit is provided for installation of rotary shaft seals in stuffing boxes that normally utilize packing secured in place by a packing follower bolted to the stuffing box. In a preferred embodiment, the kit accommodates stuffing boxes of different sizes by providing a shaft mating ring having a plurality of stepped surfaces on opposing radial faces, each adapted to fit a specific size of stuffing box, with the inner annular surfaces lapped flat, a stepped adaptor ring which can be realigned to accommodate each particular stepped surface of the mating ring with which it forms a seal and gaskets sized to fit each stepped surface of the mating ring. During installation the packing follower is aligned in a reverse direction from its normal alignment so that the leg adjacent the shaft faces outwardly away from the stuffing box. It holds the adaptor ring in place to compress a gasket between the adaptor ring and mating ring and a gasket between the mating ring and stuffing box. The inner annular lapped surface of the mating ring facing inwardly away from the packing follower contacts and forms a seal with the lapped surface of the sealing ring of the rotary shaft seal. The kit may also be used to replace conventional mechanical seals and mating rings.

6 Claims, 12 Drawing Figures

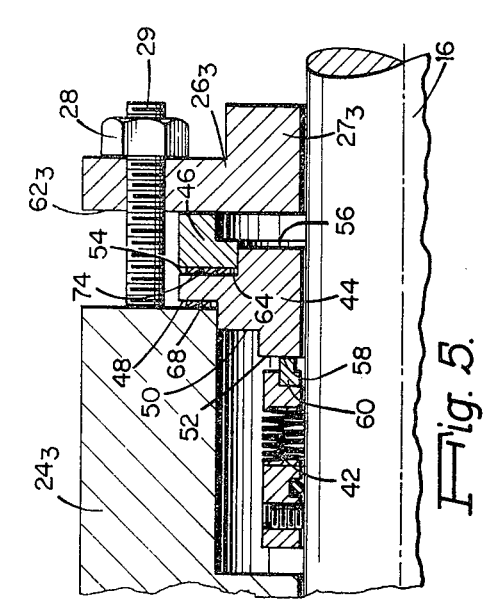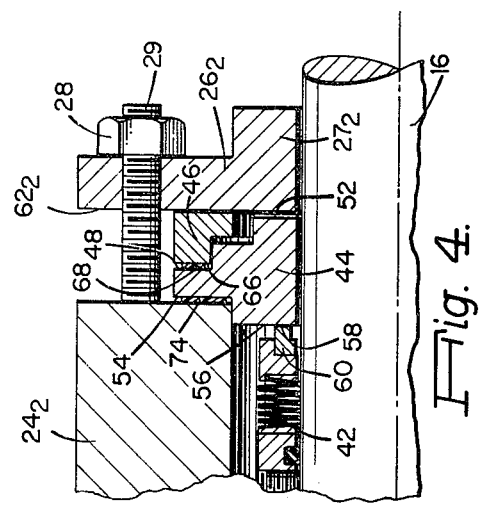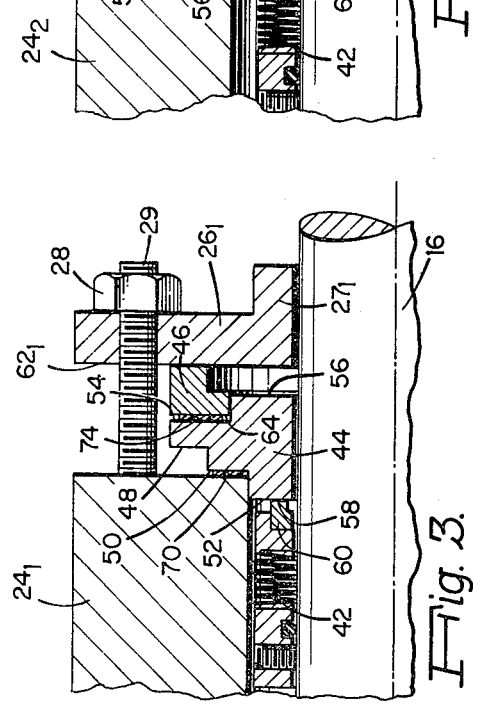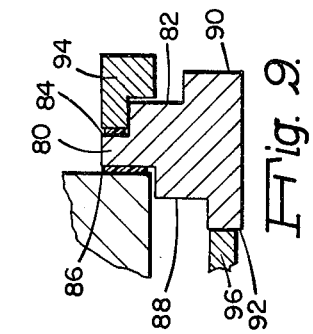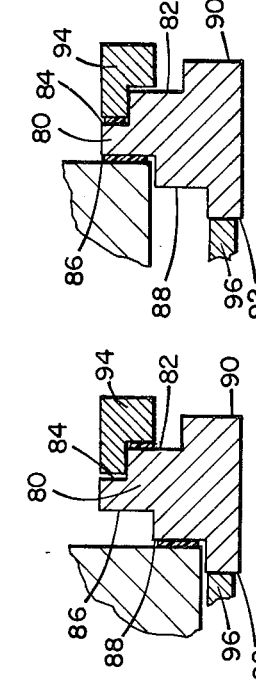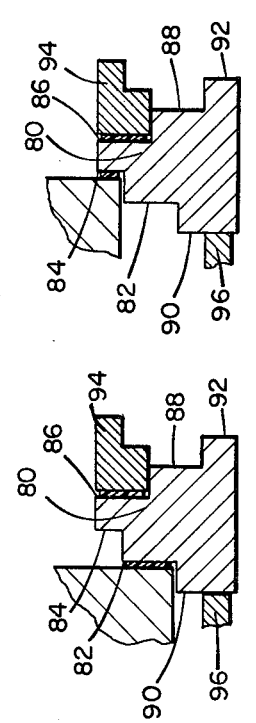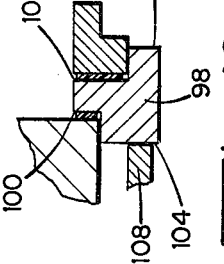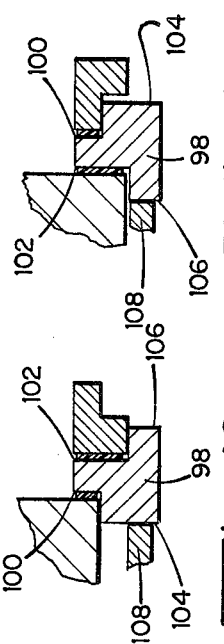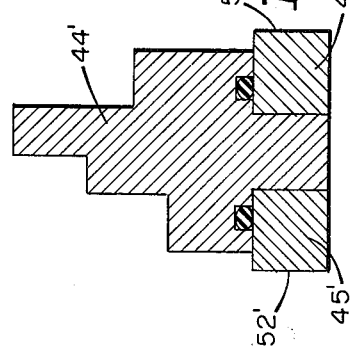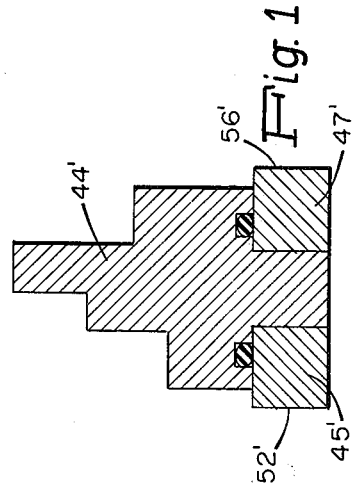

CONVERSION KIT

The present invention relates to rotary shaft seals and, more particularly, to conversion kits for replacing packing in stuffing boxes with rotary shaft seals.

A large number of pumps, compressors, mixers and agitators in chemical process industries, refineries and petrochemical industries, as well as a number of other industries, utilize packed stuffing boxes around their rotating shafts. High maintenance costs, prevention of environmental contamination, prevention of product loss, energy conservation, and other reasons often render it desirable to replace the packing with rotary mechanical seals. The prior art method of doing this requires that a gland plate be fabricated to fit the dimensions of the stuffing box. The gland plate seals off the end of the stuffing box and holds the mating ring for the seal to run against, as will hereinafter be described in greater detail. This is an expensive procedure requiring that the gland plate be fabricated and that the packing follower be scrapped. Moreover stuffing boxes of different sizes may be used with shafts of the same size in different equipments. This means that gland plates must be fabricated for each size of stuffing box, thus further increasing the cost of conversion from packing to rotary mechanical seals.

Accordingly, it is an object of the present invention to provide a relatively inexpensive conversion kit for replacement of packing with a rotary mechanical seal in a stuffing box.

Other objects and features of the invention will become apparent upon consideration of the following detailed description which proceeds with reference to the accompanying drawings, wherein:

FIGS. 3, 4 and 5 illustrate installation of rotary mechanical seals in three different sized stuffing boxes with a preferred embodiment of the conversion kit of the present invention;

FIGS. 6, 7, 8 and 9 illustrate use of an alternative embodiment of the conversion kit of the present invention with four different sized stuffing boxes;

FIGS. 10 and 11 illustrate employment of still another embodiment of the conversion kit of the present invention; and FIG. 12 illustrates an alternative embodiment of the mating ring illustrated in FIGS. 3, 4 and 5.

Figure 1:
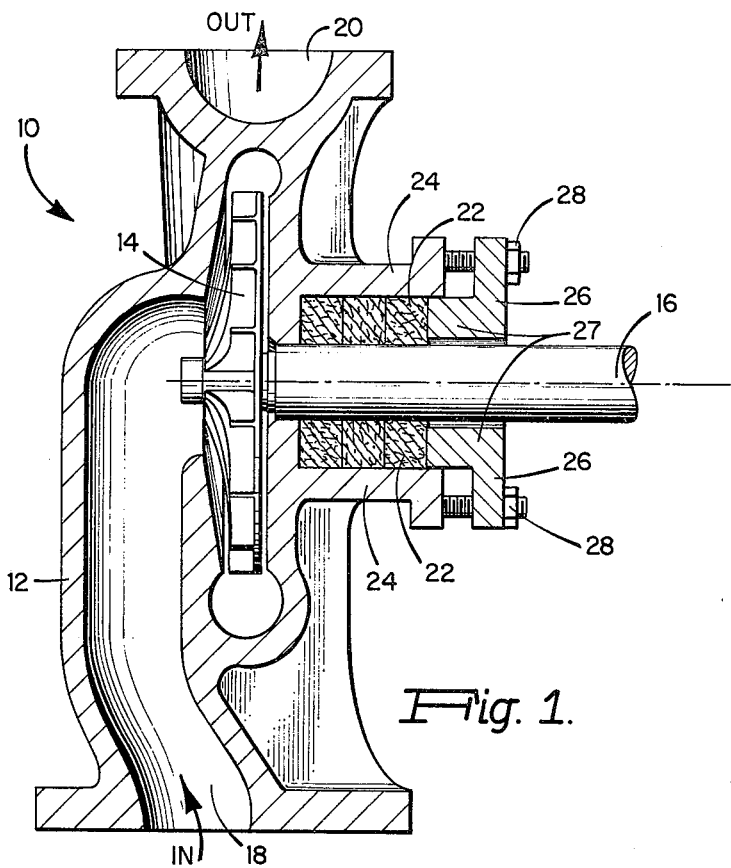
FIG. 1 illustrates schematically and partially in section a pump sealed with packing.

FIG. 1 illustrates pump 10 comprising housing 12, impeller 14 driven by drive shaft 16, input chamber 18 and output chamber 20. Packing 22 prevents leakage of the pumped fluid to the exterior along drive shaft 16. As usual packing 22 is jam packed within stuffing box 24 into sealing contact with drive shaft 16 by packing follower 26. The pressure exerted by packing follower 26 against packing 22 is increased or decreased by tightening or loosening gland nuts 28, two of which are shown.

Figure 2:
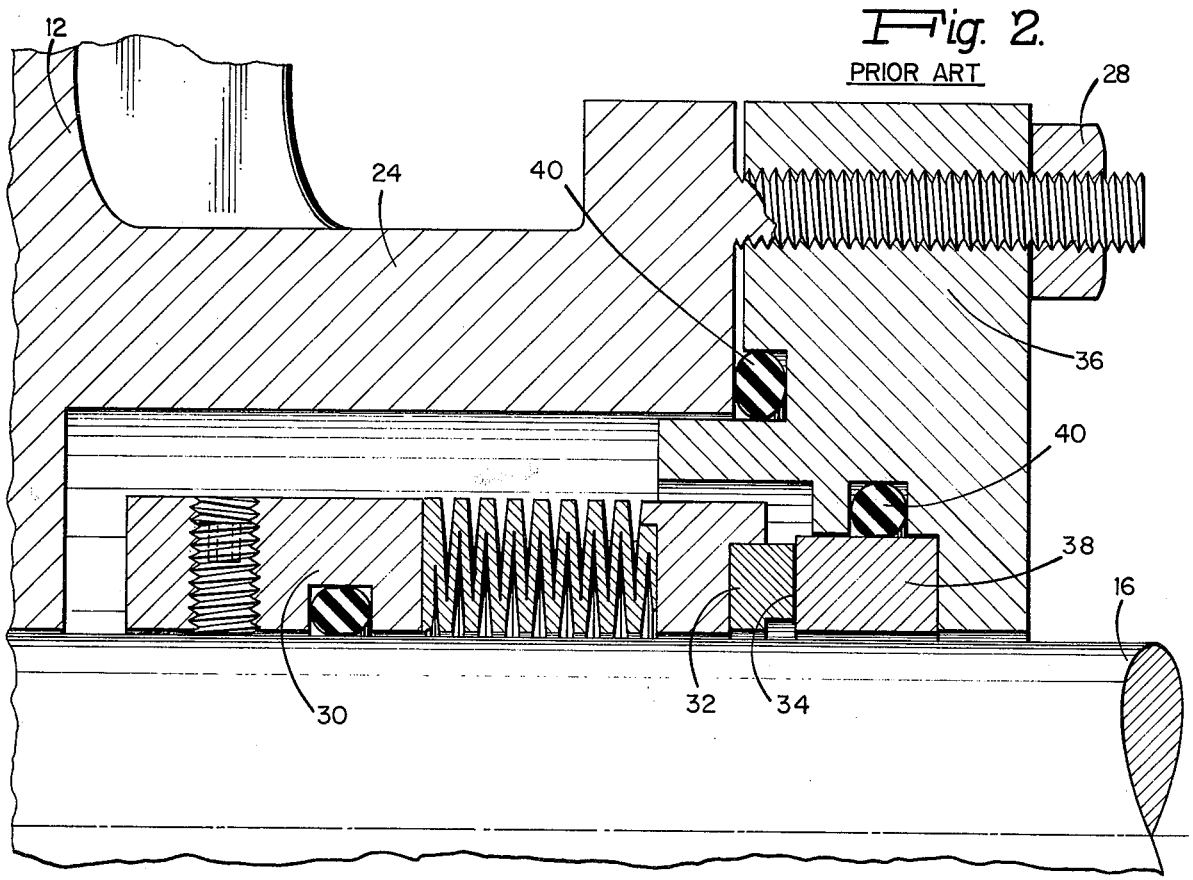
FIG. 2 illustrates a portion of FIG. 1 but with the packing replaced with a rotary mechanical seal by the prior art method.

FIG. 2 illustrates the prior art method of replacing packing 22 with a rotary mechanical seal 30 having a seal ring 32 with a face 34, usually lapped to an optical flatness of 2–4 Helium light bands. After removal of packing follower 26 and packing 22, rotary mechanical seal 30 is installed. Then special gland plate 36 having mating ring 38 and O-rings 40 is fastened to stuffing box 24 by means of gland nuts 28. As is obvious gland plate 36 must be fabricated to fit each size stuffing box. Since each size of drive shaft 16 normally has three sizes of stuffing boxes for various sealed, shafted equipment, this means that a special gland plate must be made for each size stuffing box and in all cases, stuffing follower 26 is discarded as scrap. With this in mind, I have devised the novel conversion kit now to be described.

FIGS. 3, 4 and 5 illustrate shaft 16 and three different sized stuffing boxes $24_1$, $24_2$ and $24_3$ each with a rotary mechanical seal 42 of the metal bellows type and components of the conversion kit of the present invention installed therein. Note that packing followers $26_1$, $26_2$ and $26_3$ have been reversed with legs $27_1$, $27_2$ and $27_3$ facing outwardly, away from their respective stuffing boxes. Interposed between stuffing boxes 24 and packing followers 26 are universal mating ring 44, adaptor ring 46 and two gaskets to be described hereinafter. The pressure exerted by tightening gland nuts 28 on packing followers 26 compresses the gasket between adaptor ring 46 and mating ring 44 and the gasket between mating ring 44 and stuffing box 24.

Mating ring 44 has two stepped annular surfaces 48 and 50 and an inner annular surface 52 lapped to the above-mentioned optical flatness on one radial face and one stepped annular surface 54 and an inner annular surface 56 likewise lapped to the same optical flatness on its other radial face. Note that mating ring 44 is so stepped that annular surface 50 fits the smallest sized stuffing box $24_1$, annular surface 54 fits the next larger size stuffing box $24_2$, and annular stepped surface 48 fits the largest size stuffing box $24_3$. Also note in FIGS. 3 and 5 that flat surface 58 of seal ring 60 of rotary seal 42 is in sealing contact with flat annular surface 52 of mating ring 44, while in FIG. 4 it is in sealing contact with flat surface 56 of mating ring 44.

Since the exterior surfaces $62_1$, $62_2$ and $63_3$ of packing followers $26_1$, $26_2$ and $26_3$ are roughly finished, it is necessary that a buffer piece, here adaptor ring 46, be interposed between mating ring 44 and such surfaces to minimize distortion and smooth out the loading when gland nuts 28 are tightened. Further, adaptor ring 46 is stepped as shown, having a surface 64 that mates with surface 54 of mating ring 44 and a surface 66 that mates with surface 48 of mating ring 44.

Three gaskets are provided. Gasket 68 fits surface 48; gasket 70 surface 50 and gasket 74 surface 54. During installation obviously one of these gaskets will be discarded, since only two gaskets will be used.

The gasket interposed between mating ring 44 and a stuffing box 24 performs a sealing function preventing leakage of the pumped fluid past the interface therebetween. The gasket interposed between mating ring 44 and adaptor ring 46 assists to minimize distortion and smooth out the loading.

It will now be apparent that rotary mechanical seal 30 of FIG. 2 may be replaced with another rotary mechanical seal (not shown) and a universal mating ring, similar to universal mating ring 44 of FIGS. 3, 4 and 5, may be installed merely by reversing special gland plate 36.

Moreover, universal mating ring 44' of FIG. 12 may have one or both sealing surfaces 52' and 56' lapped on rings 45' and 47'. Rings 45' and 47' may be made of any one of various materials such as, for example, dense carbon, carbon graphite, tungsten carbide, or a ceramic.

While FIGS. 3, 4 and 5 show rotary mechanical seal 42 to be of the metal bellows type, other types of rotary mechanical seals, not shown, could be used with the conversion kit of the present invention.

FIGS. 6, 7, 8 and 9 illustrate universal mating ring 80 having four stepped annular surfaces 82, 84, 86 and 88 and two surfaces 90 and 92 lapped flat together with adaptor ring 94 and gaskets sized to fit said stepped annular surfaces. In each figure one of the lapped surfaces 90 or 92 maintains sealing contact with the lapped surface of sealing ring 96. Obviously, the arrangement illustrated in FIGS. 6, 7, 8 and 9 fits four sizes of stuffing boxes that might be utilized with the same shaft size.

FIGS. 10 and 11 illustrate an alternative embodiment adapted to fit two sizes of stuffing boxes. Here mating ring 98 has two stepped surfaces 100 and 102 and two surfaces 104 and 106 lapped flat. Similarly one of lapped surfaces 104 or 106 maintains sealing contact with the lapped surface of sealing ring 108. Here two gaskets are provided and each is used regardless of the orientation of mating ring 98.

It will be seen that the object of the invention has been achieved and the advantages of the invention are now apparent. Various modifications and changes in the preferred embodiment of the invention as disclosed are contemplated and may be resorted to without departing from the function or scope of the invention as hereinafter defined by the appended claims.

I claim:

1. A conversion kit for installing rotary mechanical shaft seals having seal rings in stuffing boxes of different sizes having packing followers, comprising:

a mating ring having
in one radial face a first stepped annular surface adapted to fit a corresponding first size of stuffing box and a first inner annular surface lapped flat to form a sealing contact with a seal ring when the mating ring is installed with said one radial face facing a rotary mechanical seal, and
in the other radial face a second stepped annular surface adapted to fit a corresponding second size of stuffing box and a second inner annular surface lapped flat to form a sealing contact with a seal ring when the mating ring is installed with the other radial face facing a rotary mechanical seal; and
gaskets sized to fit the stepped annular surfaces for providing a seal between a stepped annular surface and its corresponding stuffing box.

2. A conversion kit as in claim 1 further comprising an adaptor ring having stepped surfaces sized to mate with the stepped surfaces of the mating ring and adapted to be interposed between the mating ring and the packing follower of a stuffing box.

3. A conversion kit as in claim 2 in which the mating ring has in one radial face a third stepped annular surface adapted to fit a corresponding third size of stuffing box and further comprising a gasket sized to fit the third stepped annular surface.

4. A conversion kit as in claim 2 in which the inner annular lapped surfaces are formed on separate rings and the mating ring has recesses adapted to receive the separate rings.

5. A conversion kit for replacing rotary mechanical shaft seals having seal rings installed in stuffing boxes of different sizes with gland plates, comprising:

a mating ring having
in one radial face a first stepped annular surface adapted to fit a corresponding first size of stuffing box and a first inner annular surface lapped flat to form a sealing contact with a seal ring when the mating ring is installed with said one radial face facing a rotary mechanical seal, and
in the other radial face a second stepped annular surface adapted to fit a corresponding second size of stuffing box and a second inner annular surface lapped flat to form a sealing contact with a seal ring when the mating ring is installed with the other radial face facing a rotary mechanical seal; and
gaskets sized to fit the stepped annular surfaces for providing a seal between a stepped annular surface and its corresponding stuffing box and a seal between the other stepped annular surface and a gland plate.

6. A conversion kit as in claim 5 in which the mating ring has in one radial face a third stepped annular surface adapted to fit a corresponding third size of stuffing box and further comprising a gasket sized to fit the third stepped annular surface.

* * * * *